Feb. 5, 1952     J. M. McNEEL     2,584,485
BLADE ADJUSTER FOR BRUSH CLEARING MECHANISMS
Filed April 15, 1947     2 SHEETS—SHEET 1

Inventor
J. M. McNeel
By
Attorneys.

Feb. 5, 1952 J. M. McNEEL 2,584,485
BLADE ADJUSTER FOR BRUSH CLEARING MECHANISMS
Filed April 15, 1947 2 SHEETS—SHEET 2

Inventor
J. M. McNeel
By C A Snow & Co.
Attorneys.

Patented Feb. 5, 1952

2,584,485

UNITED STATES PATENT OFFICE 2,584,485

BLADE ADJUSTER FOR BRUSH CLEARING MECHANISMS

Jess Maverick McNeel, San Antonio, Tex.

Application April 15, 1947, Serial No. 741,627

1 Claim. (Cl. 37—2)

My present invention relates to an improved blade adjuster for brush clearing mechanisms and more particularly to the means employed whereby the cutting blade will enter the ground at a sharp angle and will progressively flatten out to a horizontal plane at a predetermined depth.

The present embodiment of my invention is adapted for use with powered brush and tree removers comprising a buffer which engages and tensions the tree or brush during which time the cutting blade enters the earth adjacent the tree to cut the root system so that the tree may be easily removed.

Conventionally the blade angle is fixed and as the blade penetrates the ground its angle will increase so that on occasion the driving mechanism will be forcing the flat side of the blade against the earth instead of the cutting edge. Thus the purpose of this invention is to eliminate that difficulty.

In the accompanying drawings I have illustrated one complete example of the physical embodiment of my invention according to the best mode I have thus far devised, but it will be understood that various changes and alterations may be made in the exemplified structure within the scope of the appended claims.

Figure 1:
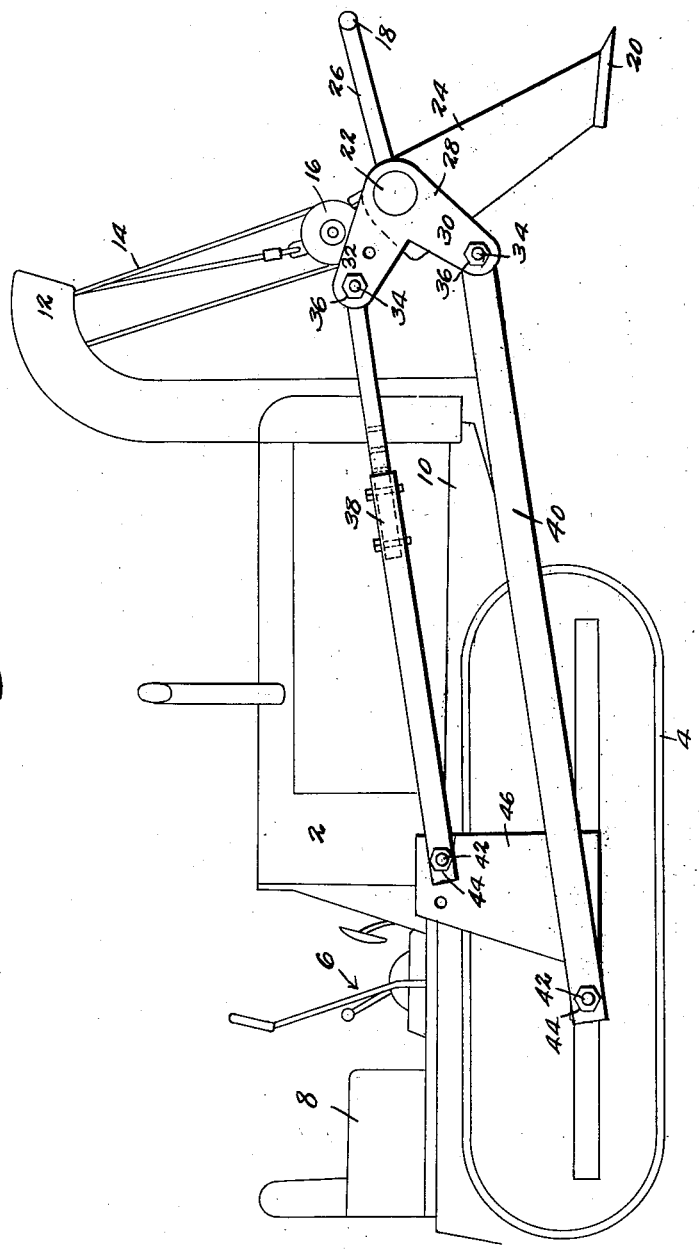
Fig. 1 is a side elevational view of the device of my invention mounted upon a tractor.
Figure 2:
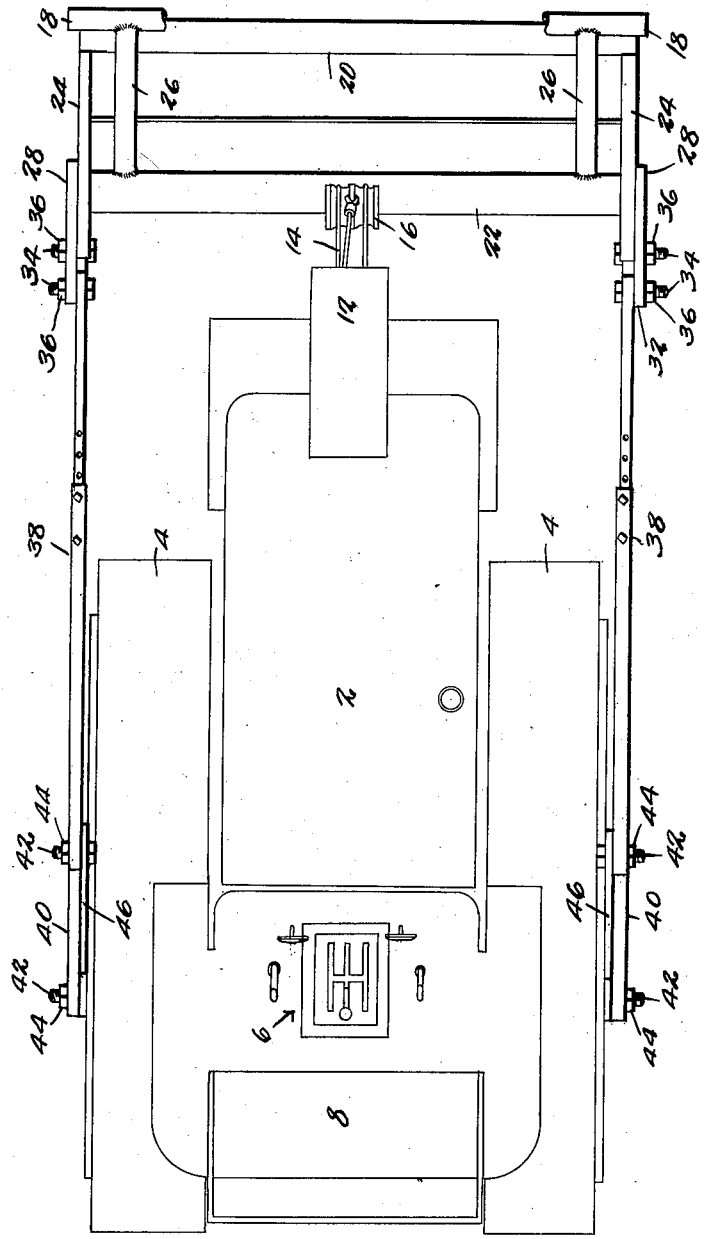
Fig. 2 is a top plan view thereof.

Referring now to the drawings, the invention is shown as used on and with a conventional tractor 2 having endless tracks 4, controls 6, and seat 8 for the driver.

From the forward frame 10 of the tractor extends upwardly the arm 12 supporting cable 14 and sheave 16 by means of which the buffer bar 18 and the blade 20 are carried. The main shaft 22 has legs 24 for the blade and the buffer bar is supported on arms 26.

The main shaft has journaled thereon at each end supports 28 formed with angularly rearwardly extending arms 30 and 32. To these arms are pivotally mounted by bolts 34 and nuts 36, the elevator arms 38 and 40 the two arms being of different lengths and the upper arm 38 being the shorter.

These arms are pivotally mounted rearwardly by bolts 42 and nuts 44 on the plates 46 suitably secured to the tractor frame and the rear pivot of the lower arm is substantially rearward of the rear pivot of the upper arm.

In use, it will be seen that as the shaft 22 and the buffer and blade are lowered, the supports 28 will pivot on the shaft 22 due to the positions of the rear pivots and the arms and due to the lengths of the arms.

As the buffer and blade assemblies lower, the angle of pitch from horizontal will be reduced to zero as seen in Fig. 1. Thus the blade will always operate at its most efficient angle, penetrating the hard crust of the earth at a sharp angle severing the roots at a lower depth in a horizontal plane like a knife.

It will be apparent from the above description that the mechanism of my invention will result in the more efficient use of the conventional tractor and its buffer and blade assemblies and will clear the land more quickly and with better results.

Having thus fully described my invention what I claim as new and desire to secure by Letters Patent is:

The combination with a tractor and supporting arm thereof, of a blade and buffer bar construction, comprising a horizontal transverse shaft, cables supporting the shaft from the arm for vertical adjustment of said blade, blade supporting legs rigidly secured to the ends of the shaft, a forwardly extended blade connecting the lower ends of the legs, a buffer bar rigidly connected with the shaft and extending beyond the cutting blade, rearwardly extended buffer ended supports journaled on the ends of the shaft, and arms of different lengths, the rear ends of the arms being pivoted in remote vertical planes on the tractor, the forward ends of which are pivotally mounted on the supports and disposed equi-distant of the shaft, whereby the lowering of the blade will vary the fixed cutting angle of the blade.

JESS MAVERICK McNEEL.

REFERENCES CITED

The following references are of record in the file of this patent:

UNITED STATES PATENTS

| Number | Name | Date |
|---|---|---|
| 2,292,904 | Shollenberger | Aug. 11, 1942 |
| 2,295,458 | Edwards | Sept. 8, 1942 |
| 2,404,760 | Washbond | July 23, 1946 |